United States Patent [19]
Zegler et al.

[11] Patent Number: 5,567,497
[45] Date of Patent: Oct. 22, 1996

[54] SKID-RESISTANT FLOOR COVERING AND METHOD OF MAKING SAME

[75] Inventors: Stephen A. Zegler, Cohutta, Ga.; Paul L. Weinle, Concord, N.C.; Lorence M. Moot, Cohutta, Ga.

[73] Assignee: Collins & Aikman Products Co., Charlotte, N.C.

[21] Appl. No.: 230,623

[22] Filed: Apr. 21, 1994

Related U.S. Application Data

[63] Continuation of Ser. No. 911,285, Jul. 9, 1992, abandoned.

[51] Int. Cl.⁶ ...................................................... B32B 3/02
[52] U.S. Cl. ............................................ 428/95; 428/88
[58] Field of Search .................................... 428/95, 88

[56] References Cited

U.S. PATENT DOCUMENTS

| | | | |
|---|---|---|---|
| 3,887,737 | 6/1975 | Baxter et al. | 428/90 |
| 4,137,356 | 1/1979 | Shoemaker et al. | 428/178 |
| 4,382,986 | 5/1983 | Reuben | 428/95 |
| 4,637,942 | 1/1987 | Tomarin | 428/95 |
| 4,731,275 | 3/1988 | Andersen | 428/95 |
| 4,917,932 | 4/1990 | McClung | 428/95 |
| 5,019,194 | 5/1991 | Friedrich | 428/95 |

FOREIGN PATENT DOCUMENTS

| | | | |
|---|---|---|---|
| 61-266680 | 11/1986 | Japan | 428/95 |
| 63-64840 | 3/1988 | Japan | 428/95 |
| 63-64841 | 3/1988 | Japan | 428/95 |
| 3-45214 | 2/1991 | Japan | 428/95 |

*Primary Examiner*—Terrel Morris
*Attorney, Agent, or Firm*—Bell, Seltzer, Park & Gibson, P.A.

[57] ABSTRACT

A floor covering comprising a floor covering face layer having a thermoplastic lower backing layer and a thermoplastic contact layer that is fusibly compatible with the lower backing layer is disclosed. The upper surface of the contact layer is fused to the lower backing layer and the lower surface of the contact layer includes a plurality of shallow thermoplastic projections which extend away from the floor covering face layer and which are sufficiently elastic to impart skid resistance to the floor covering.

6 Claims, 3 Drawing Sheets

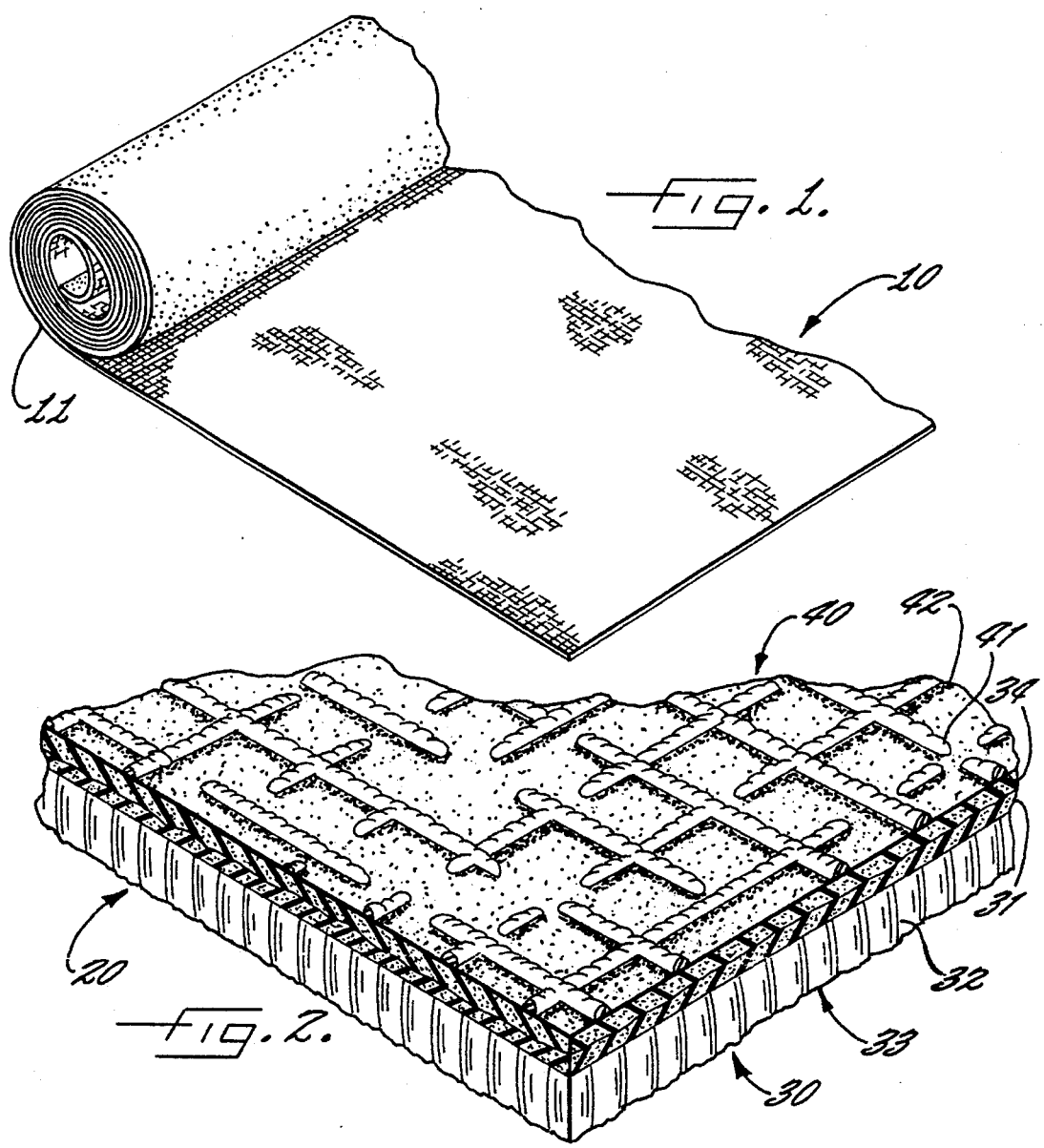
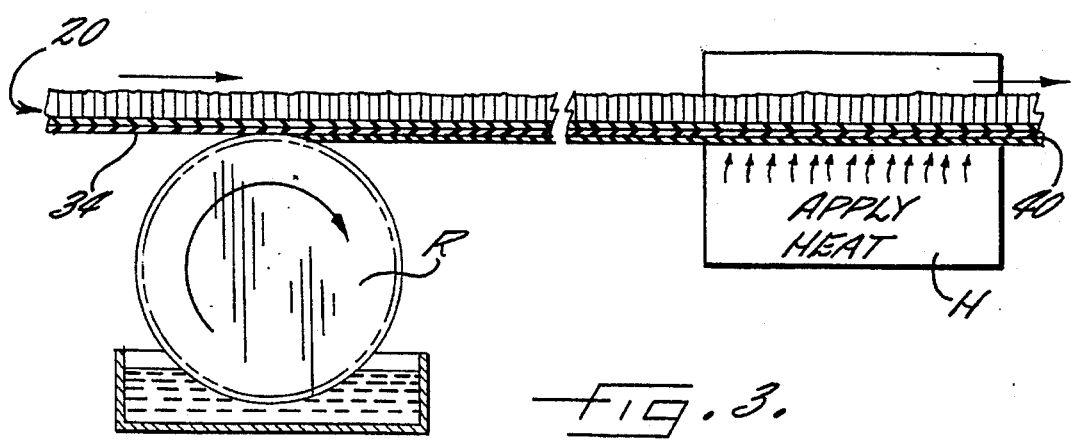

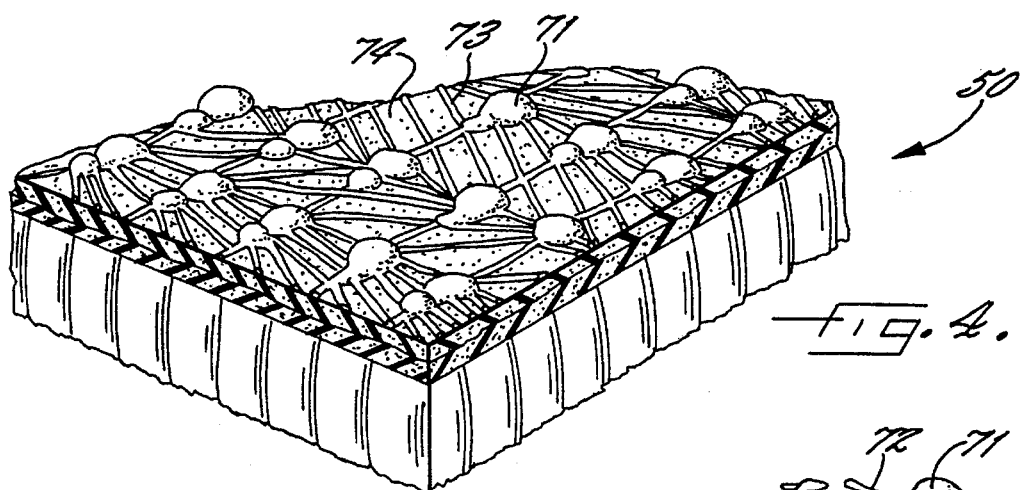
FIG. 4.
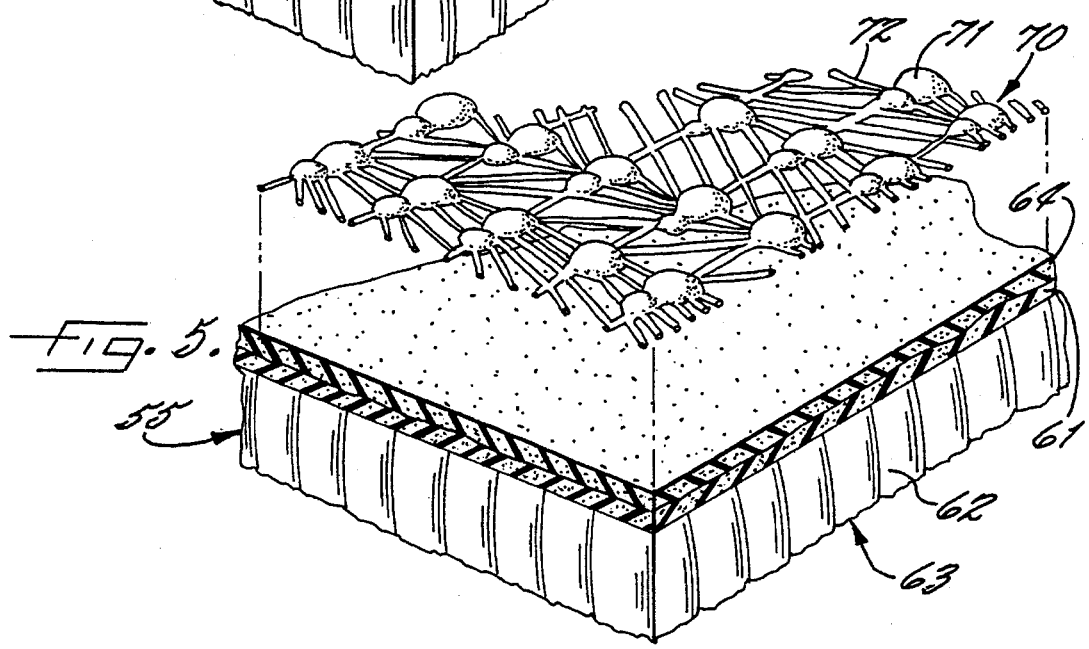
FIG. 5.
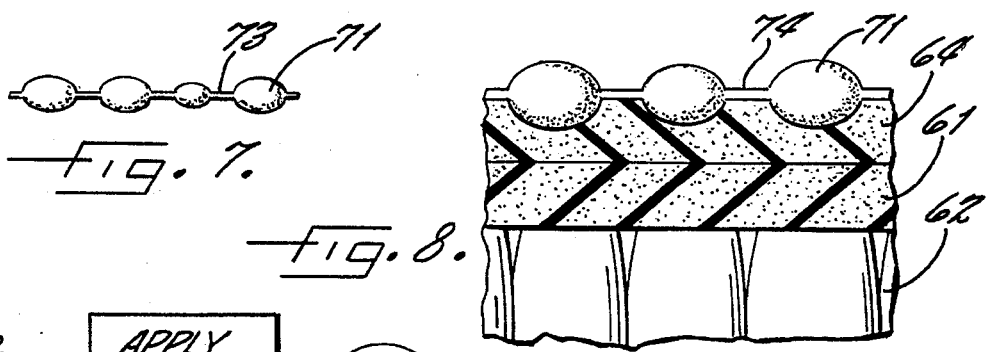
FIG. 7.
FIG. 8.
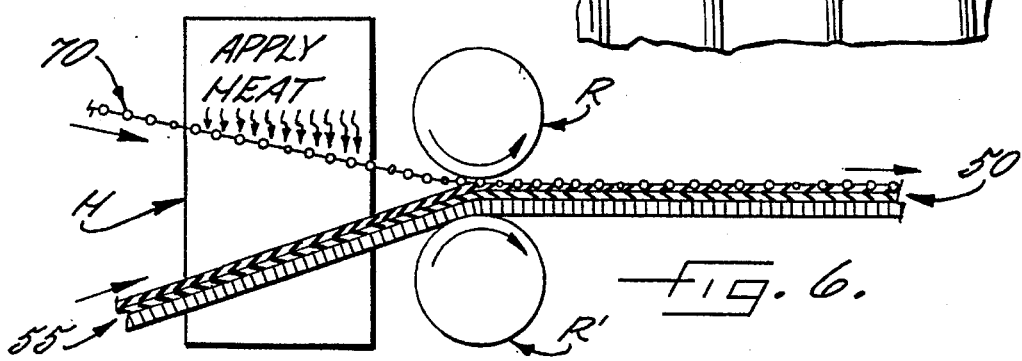
FIG. 6.

SKID-RESISTANT FLOOR COVERING AND METHOD OF MAKING SAME

This application is a continuation of application Ser. No. 07/911,285, filed 9 Jul. 1992 now abandoned.

FIELD OF THE INVENTION

The present invention relates generally to floor coverings, and relates more particularly to a skid resistant floor covering suitable for use over carpeted or hard surface floors.

BACKGROUND OF THE INVENTION

For some time, floor coverings, such as floor mats, floor tiles, and even entire carpets, have been produced to temporarily or semi-permanently overlie existing-flooring. Such floor coverings allow the consumer to change temporarily the look of a room while retaining the option of removing the overlying covering and using the underlying surface at a later date.

A major difficulty with overlying floor coverings is their tendency to slip or skid underfoot. There have been a number of different solutions offered to address the problem of skidding. Some floorings include rigid spikes or nibs on the surface adjacent the floor which penetrate the floor surface to provide a gripping force that resists skidding. (See, for example, U.S. Pat. No. 4,731,275 to Anderson). These floor coverings are suitable for use over carpeted floors, as the spikes are able to penetrate the carpet yarns without damaging them, but are less effective on and are potentially damaging to the appearance of harder smooth surface floors (e.g., parquet or other hardwood floors). Other floor coverings include a tacky adhesive on the underside of the floor covering which adhesively bonds the floor covering to the flooring. (See, for example, U.S. Pat. No. 4,798,644 to Scott). These floor coverings are effective when overlying hard surfaces, as the adhesive bonds to the immovable floor surface and therefore provides firm footing, but are less effective when overlying carpet. The carpet yarns adhering to the floor covering deflect under walking pressure. The accompanying movement of the yarns causes the footing to be somewhat unstable. In addition, these floor coverings generally experience difficulty with so-called "blinding" which is the tendency of adhesive surfaces to attract dirt, dust, and other contaminants which adversely affect the gripping force of the overlying flooring on the underlying surface. Blinding is particularly prevalent if the floor covering is released after attachment to the underlying flooring, then replaced. Further, after the flooring is removed, often a portion of the adhesive layer is left behind on the underlying floor that permanently mars the appearance of the floor.

A different approach to the problem is to adhere an additional "non-skid" layer to the backing of a floor covering made of a material having a high coefficient of friction, such as a polyurethane foam layer. (See, for example, commonly assigned U.S. Ser. No. 07/642,926). The non-skid layer resists skidding when overlying both hard surface and carpeted floors, does not damage the underlying floor, and is easily removed and replaced without affecting the skid-resistance of the floor covering. However, these floor coverings are typically more effective when overlying smooth floors than carpets; moreover, the skid-resistance of the floor covering is reduced as dirt and dust particles collect on and blind its lower surface; thus its use requires regular cleaning of the skid-resistant surface and the underlying floor.

In short, the prior art fails to disclose a floor covering which provides acceptable skid-resistance when overlying hard surface and carpeted floors without damaging the underlying floor, and which can be easily removed and replaced.

SUMMARY OF THE INVENTION

In view of the foregoing, it is an object of the present invention to provide a skid-resistant floor covering suitable for use on hard surface or carpeted floors.

It is a further object of the present invention to provide such a floor covering which is easily manufactured with conventional manufacturing methods.

It is still another object of the present invention to provide a method for producing such a floor covering.

These and other objects are accomplished by the present invention, which as a first aspect includes a skid-resistant floor covering suitable for use over smooth or carpeted floors. The floor covering comprises (i) a floor covering layer which includes a face layer and a thermoplastic lower backing layer and (ii) a thermoplastic contact layer that is fusibly compatible with and fused to the lower backing layer. The lower surface of the contact layer includes a plurality of shallow thermoplastic projections which extend away from the floor covering face layer and which are sufficiently elastic to impart skid resistance to the floor covering. In one embodiment of the present invention, the floor covering face layer is a tufted carpet, and the lower backing layer and the contact layer each comprise a plastisol containing a vinyl chloride/vinyl acetate copolymer.

The present invention also provides a method for making a skid-resistant floor covering suitable for use over smooth or carpeted floors. The method comprises the steps of (i) applying a thermoplastic contact layer to the lower surface of a floor covering face layer wherein the floor covering face layer includes a thermoplastic backing that is fusibly compatible with the thermoplastic of the contact layer, and wherein following the application step the lower surface of the contact layer includes a plurality of shallow projections which extend away from the floor covering face layer, and (ii) heating the face layer and the contact layer so that the thermoplastic layers fuse. In one embodiment, the step of applying the thermoplastic layer comprises applying a substantially constant thickness layer of a thermoplastic material preferably in liquid or molten form to the lower surface of the floor covering face layer, then passing a scraping blade over the contact layer which removes narrow strips of molten thermoplastic from the contact layer and thereby forms narrow channels in the contact layer.

BRIEF DESCRIPTION OF THE DRAWINGS

Some of the objects and advantages of the invention having been stated, other objects will appear as the description proceeds when taken in conjunction with the accompanying drawings in which:

FIG. 1 is an isometric view of a roll of floor covering in accordance with the present invention.

FIG. 2 is an inverted isometric sectional view of a floor covering in accordance with present invention and showing the thermoplastic contact layer comprising a discontinuous checkerboard pattern of shallow projections.

FIG. 3 is a schematic depiction of the method of making the embodiment of FIG. 2.

FIG. 4 is an enlarged inverted isometric view of a floor covering showing the thermoplastic contact layer comprising an open-weave scrim having thermoplastic nodules at certain of its intersection points.

FIG. 5 is an exploded isometric view of the embodiment of FIG. 4 showing the configuration of the scrim layer prior to its being fused onto the floor covering.

FIG. 6 is a schematic depiction of the method of making the floor covering of FIG. 4.

FIG. 7 is a side view of the scrim layer used to produce the floor covering of FIG. 4.

FIG. 8 is a side view of the floor covering of FIG. 4 showing the relationship of the contact layer to the secondary backing of the floor covering.

DETAILED DESCRIPTION OF THE INVENTION

Figure 9:
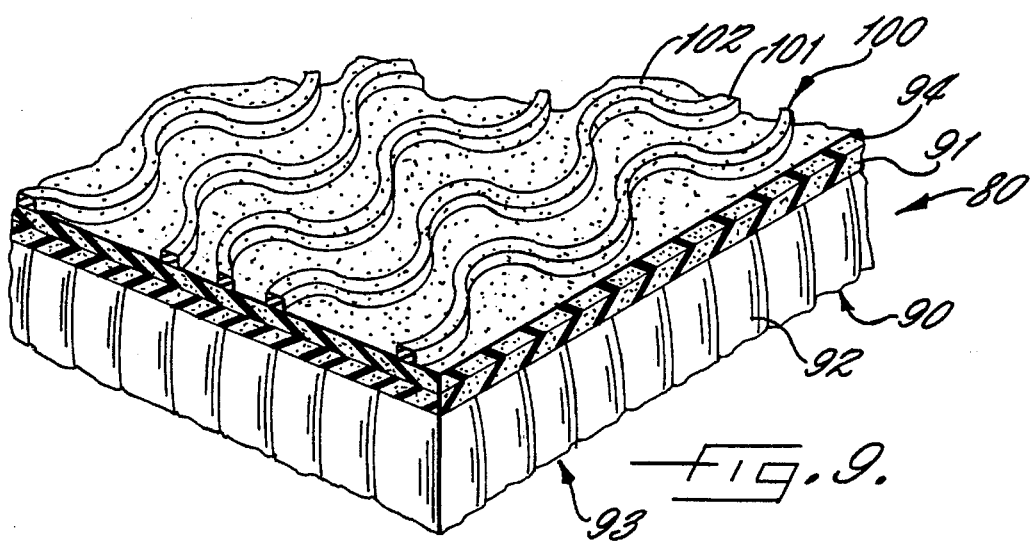
FIG. 9 is an enlarged isometric view of a floor covering showing the projections of the thermoplastic contact layer comprising substantially parallel serpentine ridges.

Referring now specifically to the drawings, and more particularly to FIG. 1, a reference numeral 10 designates the floor covering of the present invention subsequent to its manufacturing and is shown convoluted into a roll form 11. It will be understood by those skilled in this art that the invention can take many other forms, including but not limited to a carpet tile, a carpeted mat, and a rubber-faced anti-fatigue mat.

The floor covering 10 comprises (i) a floor covering layer, exemplified by a thermoplastic-backed carpet 20 illustrated in FIG. 2, comprising a face layer, exemplified in FIG. 2 by a tufted carpet and a thermoplastic lower backing layer 34, and (ii) a thermoplastic contact layer 40 that is fusibly compatible with and fused to the lower backing layer 34. As used herein, the term "fusibly compatible" when referring to two thermoplastics in adjacent layers means thermoplastics which can be permanently fused to one another under heat and pressure without any external attachment enhancer, such as a mechanical fastener or an adhesive. The term "fused" when referring to two contacting thermoplastic layers indicates that the layers are permanently bonded without the use of any external attachment enhancer. The thermoplastic contact layer 40 includes on its lower surface a plurality of shallow thermoplastic projections, exemplified by ridges 41 in FIG. 2, which extend away from the face layer 30. These thermoplastic projections are sufficiently elastic to impart skid resistance to said floor covering.

The face layer can be any material that would be suitable for use as the visual or working surface of an overlying floor covering. Generally the face layer is a decorative surface, such as a tufted carpet, woven carpet, linoleum tile, or vinyl flooring, but could also comprise a non-decorative surface, such as a rubber surface for use in an anti-fatigue work mat. The exemplary thermoplastic-backed carpet 20 of FIG. 2 comprises as its face layer the tufted carpet 30, which comprises a fabric primary backing layer 31 and tufted yarns 32 secured through and to the fabric backing layer 31 to provide a tufted pile face surface 33. The primary backing layer 31 is illustrated as a woven polypropylene cloth, but those skilled in this art will understand that the primary backing can be any fabric or non-fabric backing known to be suitable for retaining carpet yarns 32.

The thermoplastic lower backing layer 34 is attached to the primary backing layer 31 on the surface opposite the tufted pile surface 33. The thermoplastic backing layer 34 can comprise any thermoplastic which is fusibly compatible with the thermoplastic of the contact layer 40 and which will withstand the rigors of fusing. Suitable thermoplastic materials include petroleum resins, vinyl polymers, polybutene resins, polyisobutene-butadiene resins, polyurethanes, polyacrylates, and copolymers, mixtures, and plastisols thereof. A preferred thermoplastic suitable for the lower backing layer is a plastisol containing polymers and copolymers of a vinyl compound, e.g., polyvinyl chloride, polyvinylidine chloride, polyethylene chloride, polyvinyl acetate, polyvinyl acetal, etc., and copolymers and mixtures thereof. A preferred specific example of a thermoplastic for the lower backing layer is a vinyl chloride, resin-based plastisol, wherein the plasticizer component of the plastisol is a phthalate-based compound, such as an alkyl phthalate substituted one or two times with a linear or branched $C_5$-$C_{12}$ alkyl group, which is included in an amount by weight equal to between about 60 to 120 percent of the weight of the vinyl chloride resin component. Particularly preferred vinyl chlorides include Vinycel 124 (Policyd SA DE CV, Mexico), Geon® 13 oz (W. B. F. Company, Cleveland, Ohio), Pliovic M-70 (The Goodyear Tire and Rubber Company, Akron, Ohio), and Oxy 67SF (Occidental Chemical Corp., Dallas, Tex.). Particularly preferred alkyl phthalate plasticizers include Santicizer® 160 (Monsanto Company, Saint Louis, Mo.), Palatinol® 711P (BASF Corporation, Parsippany, N.J.), and Jayflex DHP (Exxon Chemical America, Houston, Tex.).

The thermoplastic comprising the secondary backing layer 34 can be a neat resin or can be filled with organic or inorganic fillers. Exemplary inorganic fillers can be in fibrous, flake, crystalline, amorphous, hollow, powder, or particulate form. Exemplary fillers include calcium carbonate, calcium sulfate particles, magnesium oxide, magnesium hydroxide, perlite, synthetic mica, vermiculite, clays, thermally stable carbon fibers, zinc oxide, dawsonite, low density hollow spheres of calcium carbonate, glass spheres, glass bubbles, thermally stable carbon microspheres, alumina, recycled fly ash, low density processed calcium carbonate, and the like, with calcium carbonate being preferred. A more preferred calcium carbonate is Duvall 85 (Franklin Limestone Company, Nashville, Tenn.).

The contact layer 40 is the layer of the floor covering 10 that rests upon the underlying floor. The upper surface of the contact layer 40 is fused to the lower backing layer 34 of the floor covering layer 20. The lower surface of the contact layer 40 includes a plurality of shallow projections extending away from the floor covering face layer. The individual projections extend in the direction away from the visual surface of the floor covering sufficiently that they will penetrate carpet yarns when the floor covering overlies a carpeted surface. Projections which extend between about 0.010 inches and 0.1 inches are preferred. The projections illustrated by the floor covering of FIG. 2 comprise linear ridges 41 but can take a variety of shapes, including but not limited to semi-spherical, semi-ovoid, triangular, diamond-shaped, hexagonal, pentagonal, prismatic, or pyramidal nodules, and linear, herringbone, or serpentine ridges or bands, or any combination thereof. Present between the projections are recesses, shown in FIG. 2 at 42, bounded by the lateral surfaces of the projections, and either the lower backing layer 34 or a thin layer of thermoplastic fused to the lower backing layer 34. The projections and recesses of the contact layer should be distributed on the contact layer with sufficient density that, absent any pressure on the floor covering layer, the contact layer rests on the floor predominantly on the projections and not on the recesses. However, the projections must be spaced sufficiently that any dirt or dust particles or any other contaminant that might tend to blind the contact surface of the contact layer will migrate to and collect within the recesses of the contact surface and not hinder the skid-resistance provided by the contact layer. In the embodiment illustrated in FIG. 2, the ridges 41 are arranged to extend parallel to the lower backing 34 and are substantially perpendicularly to one another to form a discontinuous checkerboard pattern, with recesses 42 formed by the lateral surfaces of ridges 41 and the lower surface of the lower backing layer 34. Those skilled in the art will appreciate that any number of other distribution patterns of contact elements and recesses are suitable; such distribution can be continuous or discontinuous, and can be in a repeating pattern or random.

The thermoplastic comprising the contact layer 40 should be fusibly compatible with the thermoplastic of the lower backing layer 34. Additionally, the thermoplastic should have an inherently high coefficient of friction, and it must have sufficient elasticity to deform when pressure is applied to the face layer of the floor covering so that more of the lower surface of the contact layer meets the underlying floor. Exemplary thermoplastics suitable for use in the contact layer 40 include petroleum resins, vinyl polymers, polybutene resins, polyisobutene-butadiene resins, polyurethanes, polyacrylates, and copolymers and mixtures thereof. A preferred thermoplastic suitable for the contact layer 40 is a plastisol containing polymers and copolymers of a vinyl compound, e.g., polyvinyl chloride, polyvinylidine chloride, polyethylene chloride, polyvinyl acetate, polyvinyl acetal, etc., and copolymers and mixtures thereof. A preferred specific example of a thermoplastic for the contact layer 40 is a vinyl chloride, resin-based plastisol, wherein the plasticizer component of the plastisol is a phthalate-based compound, such as an alkyl phthalate substituted one or two times with a linear or branched $C_5$-$C_{12}$ alkyl group, which is included in an amount by weight equal to between about 60 to 120 percent of the weight of the resin component. Particularly preferred vinyl chlorides include Vinycel 124, Geon® 13 oz, Pliovic M-70, and Oxy 67SF. Particularly preferred alkyl phthalate plasticizers include Santicizer® 160, Palatinol® 711P, and Jayflex DHP.

The thermoplastic comprising the contact layer 40 can be a neat resin or can be filled with organic or inorganic fillers. Any of the fillers listed above as suitable for the secondary baking layer 34 can also be used for the contact layer 40.

It is preferred that the thermoplastic comprising the contact layer have a lower density than the thermoplastic of the lower backing layer. A lower density renders the projections of the contact layer softer and more resilient and thus more effective at providing a non-skid surface when overlying hard surface floor. Moreover, the reduced density contact layer provides a cushioning effect to the flooring for increased walking comfort. It is preferred to achieve reduced density by including a blowing agent in the material comprising the contact layer prior to its being fused to the lower backing layer; more preferred is the inclusion of a heat-activated chemical blowing agent, as the foaming which reduces the density of the thermoplastic, can occur as the flooring undergoes heat fusing which generate carbon dioxide or nitrogen upon reaction or are sufficiently high boiling point halohydrocarbons. Preferred blowing agents are azo-type compounds, such as a zodicarbonaimide activated by zinc octcate. More preferred azoaicarbonamides include Ficel LE (Schering Berlin Polymers, Inc., Dublin, Ohio), and CPC-40P (Calhoun Plastics and Chemicals, Inc., Calhoun, Ga.), each of which include a zinc octcate activator within. A preferred zinc octcate activator is TZ-618 (Calhoun Plastics and Chemicals, Calhoun, Ga.).

When overlying carpeted floors, the floor covering 10 of the present invention resists skidding due to the penetration of the projections of the contact layer into the carpet yarns and the high coefficient of friction of the thezmoplastic comprising the contact layer on the carpeted surface. When overlying smooth floors, the floor covering 10 resists skidding due to a combination of the high coefficient of friction of the thermoplastic on the floor, the elasticity of the thermoplastic, and the presence of projections and recesses on the lower surface of the contact layer. The elasticity of the thermoplastic contributes to skid resistance by allowing more of the lower surface of the contact layer to deform to contact the underlying floor when pressure is applied to the face layer of the floor covering. The recesses in the contact layer between the projections collect particulate contaminants that might blind the contact layer within those recesses, thereby removing matter that inhibits the skid-resistance of prior art floor coverings. The combination of all of these factors leads to a highly skid-resistant floor covering.

FIG. 4 shows a second embodiment of a skid-resistant floor covering 50. In this embodiment, the floor covering layer 55 comprises as a face layer a tufted carpet 60 identical to the tufted carpet 30 of FIG. 2 which includes a fabric primary backing layer 61 and tufted yarns 62 secured through and to the fabric backing layer 61 to provide a tufted pile face surface 63, and the thermoplastic lower backing layer 64 fused to the primary backing layer 61 on the surface opposite the tufted pile surface 63. Referring to FIGS. 5 and 7, the contact layer 70 comprises an open weave fabric scrim 72 and irregularly-sized semi-ovoid thermoplastic nodules 71 located on the scrim fibers 73, although those skilled in this art will appreciate that a number of suitable shapes for nodules are suitable, including semi-spherical, prismatic, pyramidal, and the like. Recesses 74 are located in the space bounded by the nodules 71, the scrim fibers 73, and the lower surface of the lower backing layer 64. The arrangement of the nodules 71 on the scrim 72, and accordingly on contact layer 70, is random, but it will be appreciated by those skilled in the art that any number of regular or irregular nodule patterns are suitable and is limited only by the pattern of scrim fibers 73.

A third embodiment of a skid-resistant carpet, designated generally at 80, is shown in FIG. 9. In this embodiment, the floor covering layer 85 comprises as its face layer a tufted carpet 90 identical to tufted carpet 30 of FIG. 2 which includes a fabric primary backing layer 91 and tufted yarns 92 secured through and to the fabric backing layer 91 to provide a tufted pile face surface 93, and the thermoplastic lower backing layer 94 attached to the primary backing layer 91 on the surface opposite the tufted pile surface 93. A contact layer 100 comprises a plurality of narrow raised bands 101 protruding generally normal to lower backing layer 94. The bands 101 extend continuously adjacent and parallel to the lower backing layer 94 in a regularly-spaced serpentine pattern; however, those skilled in this art will appreciate that a number of different band patterns would be suitable, including but not limited to linear and herringbone patterns. Recesses 102 are bounded by the bands 101 and the lower surface of the lower backing layer 94.

The present invention also includes a method of making a skid-resistant floor covering suitable for use over smooth or carpeted floors. The method comprises the steps of applying a thermoplastic contact layer to the lower surface of a floor covering face layer, wherein the floor covering face layer has a thermoplastic backing that is fusibly compatible with the thermoplastic of the contact layer, such that following the application step the contact layer includes a plurality of shallow projections which extend away from the floor covering face layer, and heating the face layer and contact layer so that the thermoplastic layers fuse. The plurality of shallow projections impart skid resistance to the floor covering.

The application step can comprise any application technique which is suitable for producing a plurality of shallow projections of a desired configuration on the lower surface of the contact layer. During the application step, the thermoplastic of the contact layer should be sufficiently fluid to be formed into the desired projection shape and should be sufficiently tacky that will adhere to the lower backing until they fused. FIG. 3 illustrates a method of making the carpet illustrated in FIG. 2 wherein the contact layer 40 is applied by contacting the lower backing 34 of the thermoplastic-backed carpet 20 with the surface of a roller R which has on its circumferential surface grooves filled with molten thermoplastic. The roller R collects molten thermoplastic in these grooves as they rotate through a thermoplastic-containing vat located directly beneath the roller R. The roller surface carrying the thermoplastic contacts the lower backing surface 34 as it is conveyed adjacent and above the roller R; thermoplastic is transferred from the roller R to the lower backing 34 to form the contact layer 40. In so doing the thermoplastic holds the shape of the grooves of the roller R. Other exemplary application techniques include other grooved surface transfer techniques, screening techniques, splatter spraying, coating with thermoplastic followed by removal of excess by scraping, and applying a scrim carrying thermoplastic on its fibers.

The heating step comprises heating the face layer and contact layer so that they will fuse permanently. Any heating technique or apparatus known to those skilled in the art to be suitable for transferring heat to a floor covering can be used, such as radiant heating, infrared heating, and resistance heating. The temperature chosen should be one at which the thermoplastic of the contact layer and the thermoplastic of the lower backing layer become sufficiently fluid that the layers co-mingle; when the composite is later cooled, the co-mingled portions of the layers form a series of microscopic locking structures which bind the layers permanently. The preferred fusing temperature for the preferred vinyl chloride/vinyl acetate plastisol is between about 175° C. and 240° C. FIG. 3 illustrates that the heating step of the method in making the carpet of FIG. 2 is carried out in a conventional heating oven H as the carpet carrying the liquid or molten contact layer is conveyed from the roller R. The carpet is heated within the oven until the lower backing layer 34 and the contact layer 40 fuse. The finished carpet 10 is permitted to cool and is then processed into its final form.

Because it is preferred that the thermoplastic of the contact layer have a lower density than the thermoplastic of the lower backing layer, the formulation used in the contact layer may include a blowing agent. Preferred is a heat activated blowing agent, such as an azo-type compound, which will foam the contact layer during the heating step.

FIG. 6 illustrates a second embodiment of the method which produces the carpet 50 of FIG. 4. The contact layer 70 comprises a scrim 72 having semi-ovoid thermoplastic nodules 71 on its fibers 73. The thermoplastic-coated scrim 72 and a tufted carpet 60 are first passed through a heating chamber H. After the scrim 72 and the face layer 60 have been heated to the appropriate temperature, they are pressed together and thereby fused between a set of non-contacting, adjacent, oppositely rotating rollers R, R', the space between which is about ⅛ to 1/32 inch less than the thickness of the carpet 60. The pressure applied across the fusing layers facilitates the co-mingling of the layers, thus producing a stronger interlayer bond. The finished carpet 50 is then permitted to cool and is then processed into its final form.

Figure 10:
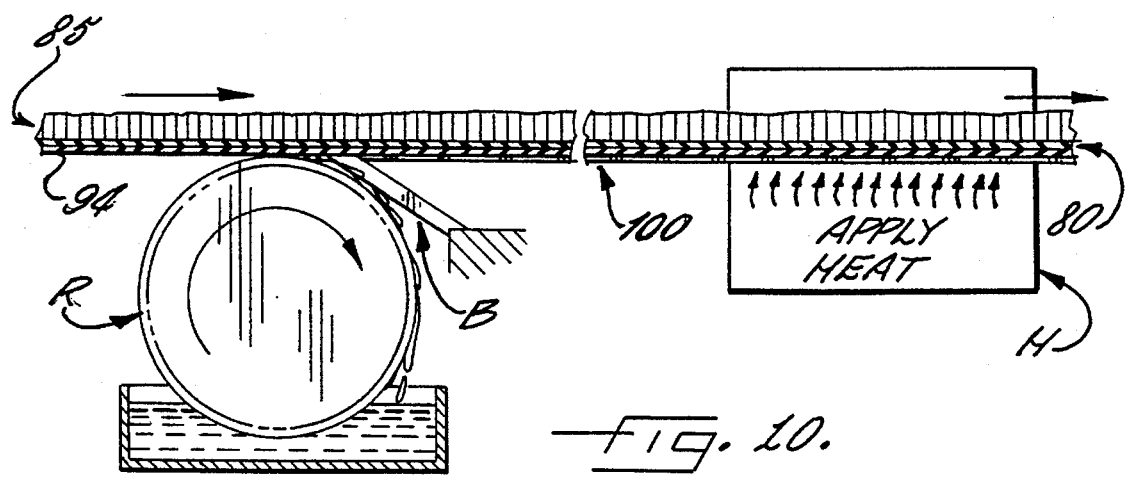
FIG. 10 is a schematic depiction of the method of making the carpet of FIG. 9.

FIG. 10 illustrates a third embodiment of the method which produces the carpet 80 shown in FIG. 9, wherein the contact layer 100 comprises a pattern of parallel serpentine bands 102. The application of the contact layer 102 comprises first contacting the lower backing layer 94 with a roller R carrying a thick coating of thermoplastic as the tufted carpet 90 passes above an adjacent the roller R. On contact, the thermoplastic coating is transferred to the lower backing layer 94 to form a single thickness contact layer 100. The face layer/contact layer composite then passes over a reciprocating serrated blade B aligned perpendicular to the direction of travel of the composite. The blade B creates the bands 101 and the recesses 102 of the contact layer 100 by scraping with its protruding serrated edges portions of the thermoplastic from the contact layer 100, although those skilled in the art will appreciate that any means suitable which produces the thermoplastic bands 101 can be used. The serpentine pattern of the contact layer 100 is produced by the reciprocating motion of the blade B perpendicular to the direction of carpet travel. The thermoplastic scraped from the contact layer 100 is conveyed on the roller R back into the thermoplastic vat for re-application. The carpet 80 is then conveyed into a heating chamber H for heating until fusing occurs.

The present invention is illustrated in the following examples, which are not intended to be limiting, but instead are included to provide full understanding of the invention.

EXAMPLES 1–4

Each of the following formulations represents an exemplary plastisol suitable for use in the contact layer of the floor covering.

| Material Trade Name | Material Type | Quantity (Parts by Weight) |
|---|---|---|
| Geon 138 | Poly(vinyl chloride)acrylic copolymer resin | 100 |
| Pliovic M-70 | Poly(vinyl chloride) resin | 100 |
| Duvall 85 | Calcium Carbonate filler | 50 |
| Palatinol 711-P | Phthalate Esters plasticizer | 50 |
| Jayflex DHP | Phthalate Esters plasticizer | 30 |
| CPC 40-P | Azodicarbonamide /Zinc octoate blowing agent/ activator | 8 |
| CPC TZ-618 | Zinc Octoate activator | 8 |

EXAMPLE 2

| Material Trade Name | Material Type | Quantity (Parts by Weight) |
| --- | --- | --- |
| Oxy 67SF | Poly(vinyl chloride) resin | 100 |
| Duvall 85 | Calcium Carbonate filler | 30 |
| Palatinol 711-P | Phthalate Esters plasticizer | 25 |
| Jayflex DHP | Phthalate Esters plasticizer | 10 |
| CPC 40-P | Azodicarbonamide /Zinc Octoate blowing agent/ activator | 6 |

EXAMPLE 3

| Material Trade Name | Material Type | Quantity (Parts by Weight) |
| --- | --- | --- |
| Vinycel 124 | Poly(vinyl chloride) resin | 100 |
| Goodyear M-70 | Poly(vinyl chloride) resin | 100 |
| Duvall 85 | calcium Carbonate filler | 50 |
| Jayflex DHP | Phthalate Ester plasticizer | 60 |
| Santicizer 160 | Butyl Benzyl Phthalate plasticizer | 30 |
| Ficel LE | Azodicarbonamide blowing agent | 10 |

EXAMPLE 4

| Material Trade Name | Material Type | Quantity (Parts by Weight) |
| --- | --- | --- |
| Geon 138 | Poly(vinyl chloride)acrylic copolymer resin | 100 |
| Goodyear M-70 | Poly(vinyl chloride) resin | 100 |
| Duvall 85 | Calcium Carbonate filler | 50 |
| Palatinol 711-P | Phthalate Esters plasticizer | 55 |
| Jayflex DHP | Phthalate Ester plasticizer | 30 |
| Ficel LE | Azodicarbonamide blowing agent | 10 |

These formulations can then be fused in an appropriate configuration to a fusibly compatible secondary backing layer to form a skid-resistant floor covering.

Although specific terms are employed in the description and illustrative examples of the invention, they are used in a generic and descriptive sense only and not for the purposes of limitation, the scope of the invention being defined in the following claims.

That which is claimed is:

1. A skid-resistant carpet suitable for use on smooth or carpeted floors comprising:

(a) a carpet face layer including a fabric backing layer, tufted yarns secured through and to said fabric backing layer to provide a tufted pile face surface, and a thermoplastic secondary backing layer; and (b) a thermoplastic contact layer fusibly compatible with and fused to said thermoplastic secondary backing layer having a plurality of narrow herringbone or serpentine raised bands, the thermoplastic of said contact layer being fusibly compatible with said secondary backing layer, and said bands being sufficiently elastic to impart skid-resistance to the carpet.

2. A carpet according to claim 1 wherein said thermoplastic lower backing layer and said thermoplastic contact layer comprise the same thermoplastic.

3. A carpet according to claim 1 or 2 wherein said lower backing layer comprises a thermoplastic selected from the group consisting of petroleum resins, vinyl polymers, polybutene resins, polyisobutene-butadiene resins, polyurethanes, polyacrylates, and copolymers, mixtures, and plastisols thereof, and wherein said contact layer comprises a thermoplastic selected from the group consisting of petroleum resins, vinyl polymers, polybutene resins, polyisobutene-butadiene resins, polyurethanes, polyacrylates, and copolymers, mixtures, and plastisols thereof.

4. A carpet according to claim 1 or 2 wherein said lower backing layer comprises a thermoplastic containing vinyl polymers and copolymers, and wherein said contact layer comprises a thermoplastic containing vinyl polymers and copolymers.

5. A carpet according to claim 1 or 2 wherein said lower backing layer comprises a vinyl chloride plastisol.

6. A carpet according to claim 1 wherein said contact layer comprises a thermoplastic having a lower density than the thermoplastic comprising said backing layer.

* * * * *